UNITED STATES PATENT OFFICE.

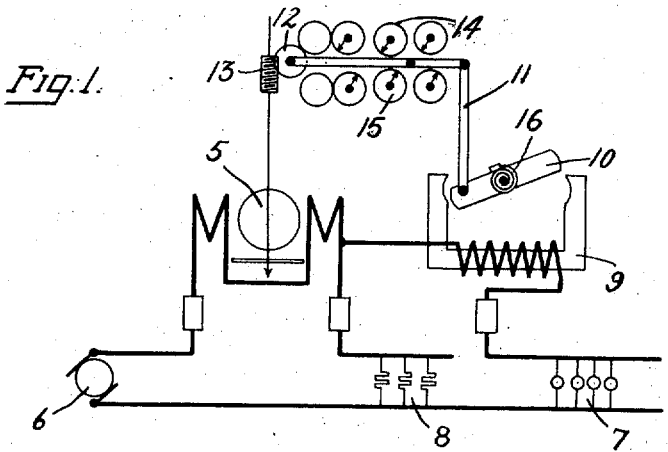
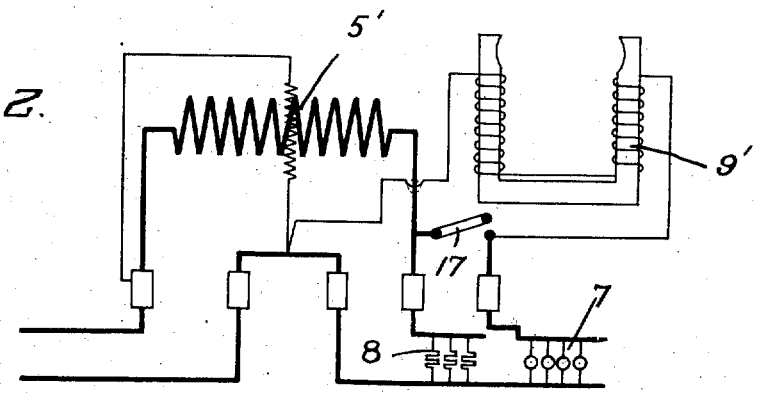

KARL MARKAU, OF BERLIN, GERMANY, ASSIGNOR TO GENERAL ELECTRIC COMPANY, A CORPORATION OF NEW YORK.

SYSTEM OF ELECTRIC METERING.

1,077,729.  Specification of Letters Patent.  Patented Nov. 4, 1913.

Application filed July 23, 1912. Serial No. 711,065.

*To all whom it may concern:*

Be it known that I, KARL MARKAU, a subject of the King of Prussia, residing at Berlin, Germany, have invented certain new and useful Improvements in Systems of Electric Metering, of which the following is a specification.

My invention relates to systems of metering electrical energy and particularly to multiple rate systems in which the consumer is charged different rates for the energy consumed according to the purposes for which the energy is used. The load curve of most central electric generating stations shows a maximum demand for energy during the evening hours, when consumers are using large amounts of energy for lighting purposes. During the other hours of the day the demand for energy is relatively very small. Obviously, it is most desirable that the load curve of the central station be as uniform as possible.

The object of my invention is generally to provide a system of metering electrical energy which will induce consumers to use energy freely for some purposes, but will tend to restrict the use of electricity for one particular purpose.

More specifically, the object of my invention is to provide a system of metering electrical energy which will induce consumers to use such energy freely for power and heating purposes during the period of the central station's light load, but to discourage the consumption of energy for such purposes during the period of peak load, and thereby improve the present load curve of the central station.

I accomplish the object of my invention by providing a single meter with a plurality of register dials, which are adapted to record the energy supplied to a plurality of sets of electric translating devices. One of the register dials is designed to record the total amount of energy consumed in all the sets of translating devices only during the times that the consumption of energy in one particular set of translating devices exceeds a predetermined amount. This predetermined amount may of course be zero, in which case whenever any energy is taken by this particular set of translating devices, the registration will be upon this dial. The energy consumed at other times will be recorded on the other dials.

The translating devices will ordinarily consist of two sets, although my invention is not limited to this particular number of sets. The energy used for lighting purposes will ordinarily be included in one set of translating devices, and the energy used for power purposes, as motors, electric heaters and the like, will be included in the second set. One dial of the meter will record the total amount of energy consumed in both sets of translating devices only during the times that the energy consumption in the set comprising the lights exceeds a predetermined amount. The energy consumed at all other times in both sets of devices will be recorded on the second dial. If, therefore, the consumer is charged a higher rate for the energy registered on the first dial than for that registered on the second dial, he will be induced to use as little energy as possible during the times that his consumption is being registered on this dial. The consumption will be registered on this dial only during the times that energy above a predetermined amount is being consumed for lighting purposes, and hence, generally, during the period of peak load on the central station. Since the rate charged the consumer for energy registered on the second dial is very attractive, he is induced to use energy freely for power purposes during the period of light load upon the central station, and since he is also induced to restrict his consumption of energy for power purposes to a minimum amount during the period of peak load, the load curve of the station is materially improved.

The novel features which I consider to be characteristic of my invention will be definitely indicated in the claims appended hereto; the features of construction, and mode of operation will be understood by reference to the following description taken in connection with the accompanying drawings, which show the preferred embodiment of my invention and in which—

Figure 1 illustrates diagrammatically a metering system employing the principles of my invention; and Fig. 2 is a modification of the invention, the register dials and coöperating mechanism being omitted.

Referring to Fig. 1 of the drawings there is shown diagrammatically an ampere hour meter 5, adapted to measure the current supplied by a source of electrical energy 6 to two sets of translating devices 7 and 8. The devices 7 may consist of lights, while the devices 8 may consist of motors, electric heaters and the like. An electromagnet 9 has its winding included in the lighting circuit 7, and its coöperating armature 10 is connected to a link mechanism 11. The armature and link mechanism control the movement of a movable gear member 12, which is always in mesh with the worm 13 on the meter shaft, and is adapted to drive either of the gear trains of the register dials 14 and 15. As shown in the figure, when the armature is in its normal position, which is maintained by an adjustable spring 16, the revolutions of the meter shaft are registered on the dial 14.

The operation of my new system of metering is as follows: When no current is being used for lighting purposes the armature 10 is held in the position shown in Fig. 1 by the spring 16, and the current consumed in the translating devices 8 is registered on the dial 14. As soon as current is taken by the devices 7 for lighting purposes, the magnet 9 becomes energized and attracts its coöperating armature 10, whereby the link mechanism throws the movable gear 12 into operative relation with the gear train of dial 15. The current taken for lighting purposes will thus be registered on dial 15, as well as all current taken by the devices 8 for power purposes during the times that current is being taken for lighting purposes.

The tension of spring 16 may be so adjusted that the change in the registration from dial 14 to dial 15 will take place only when a predetermined amount of current is being taken for lighting purposes by the translating devices 7. Although I have selected for the purpose of illustration in Fig. 1 an ampere hour meter, it is obvious that my invention is not limited to this particular type of meter, but is adapted to be carried out with any type of electric meter.

In Fig. 2 I have shown a modified form of construction whereby the consumer himself effects the change in the registration from one dial to another. In this figure a meter 5′ measures the energy supplied to the translating devices 7 and 8. A switch 17 is conveniently placed in the meter casing. When the switch 17 is open energy be taken by both sets of translating devices 8, but when the switch is closed energy can be taken by both sets of translating devices. The consumer can operate this switch at will, and when he desires to use energy in the translating devices 7 he closes the switch 17. Under this latter condition the energy consumed in both sets of translating devices will be registered on the dial corresponding to dial 15, of Fig. 1.

An electromagnet 9′, provided with a potential winding, is arranged to be connected in parallel with the circuit of the lighting devices 7 when switch 17 is closed. One terminal of the winding of the electromagnet is permanently connected to one conductor of the supply source and the other terminal of this winding is adapted to be connected to the other conductor of the supply source through the switch 17, and the current winding of the meter 5′. When the switch 17 is closed the electromagnet 9′ is thus energized and operates, like the electromagnet 9, shown in Fig. 1, to place the gear train of one of the dials, as 15 in Fig. 1, in operative relation with the meter shaft. The gear trains and dials have been omitted in Fig. 2 in order to simplify the drawings, but it will be understood that the armature of electromagnet 9′ is operatively connected to these elements in a manner similar to the operative connection of armature 10 to register dials 14 and 15 shown in Fig. 1.

It will thus be apparent that I have provided a metering system which registers the total energy consumed in all the translating devices upon one dial only during the times that energy, or energy above a predetermined amount, is being used in one of the translating devices. The energy consumed at all other times will be registered on another dial. The translating devices which thus control the dial, upon which registration takes place, will in practice ordinarily consist of electric lights. Since the consumer will normally desire to use his lighting devices only during the period of peak load on the central station it is obvious that my system of metering will operate to improve the load curve of the station. The consumer will be encouraged to use energy at the reduced rate when his lighting devices are out of operation, and he will be likewise induced to refrain from any large consumption of energy for power purposes during the times that his lights are in operation, and he is paying the higher rate.

It is obvious that the translating devices 7, may consist of other electrical apparatus than lights. Where it is desired to restrict the consumption of electrical energy in all classes of apparatus during the times that energy is being consumed in a particular class of apparatus, then the devices 7 will consist of the apparatus of the latter class. In some cases it may be desirable to merely restrict the use of electricity in a certain class of apparatus, and the devices 7 may then be composed of this class of apparatus.

I desire it to be understood that my invention is not limited to the particular construction or arrangement of devices here shown, since many changes, which do not depart from the spirit of my invention, will be obvious to those skilled in the art; which changes are within the scope of the present claims.

What I claim as new and desire to secure by Letters Patent of the United States, is:—

1. A system of metering electrical energy comprising a meter having a register dial, a plurality of sets of electric translating devices, and means for recording on said dial the total energy consumed in all of said sets of translating devices only during the times that energy is being consumed in one particular set of said translating devices.

2. A system of metering electrical energy comprising a meter having a register dial, a plurality of sets of electric translating devices, and means for recording on said dial the total energy consumed in all of said sets of translating devices only during the times that the energy being consumed in one particular set of said translating devices exceeds a predetermined amount.

3. A system of metering electrical energy comprising a meter having a register dial, two sets of electric translating devices, and means for recording on said dial the total energy consumed in both sets of translating devices only during the times that the energy being consumed in one particular set of said translating devices exceeds a predetermined amount.

4. A system of metering electrical energy comprising a meter having a register dial, a lighting circuit, a power circuit, and means for recording on said dial the total energy consumed in both circuits only during the times that the energy being consumed in the lighting circuit exceeds a predetermined amount.

5. A system of metering electrical energy comprising a meter having a plurality of register dials, a plurality of sets of electric translating devices, means for recording on one of said dials the total energy consumed in all of said sets of translating devices only during the times that energy is being consumed in one particular set of said translating devices, and means for recording the total energy consumed in said sets of translating devices at other times.

6. A system of metering electrical energy comprising a meter having a plurality of register dials, a plurality of sets of electric translating devices, means for recording on one of said dials the total energy consumed in all of said sets of translating devices only during the times that the energy being consumed in one particular set of said translating devices exceeds a predetermined amount, and means for recording the total energy consumed in said sets of translating devices at other times.

7. A system of metering electrical energy comprising a meter having two register dials, two sets of electric translating devices, means for recording on one of said dials the total energy consumed in both of said sets of translating devices only during the times that the energy being consumed in one of said sets of translating devices exceeds a predetermined amount, and means for recording on the other dial the total energy consumed in both of said sets of translating devices at other times.

8. A system of metering electrical energy comprising a meter having two register dials, a lighting circuit, a power circuit, means for recording on one of said dials the total energy consumed in both circuits only during the times that the energy being consumed in the lighting circuit exceeds a predetermined amount, and means for recording on the other dial the total energy consumed in both circuits at other times.

9. A system of metering electrical energy comprising a meter having a rotatable shaft and a plurality of register dials, a plurality of sets of electric translating devices, means for normally maintaining said shaft in operative relation with one of said dials, and means responsive to a predetermined change in the electrical condition of one of said sets of translating devices for placing said shaft in operative relation with another of said dials.

10. A system of metering electrical energy comprising a meter having a rotatable shaft and a plurality of register dials, a plurality of sets of electric translating devices, movable connecting means normally maintaining said shaft in operative relation with one of said dials, and means responsive to a predetermined change in the electrical condition of one of said sets of translating devices for moving said connecting means into operative relation with another of said dials.

11. A system of metering electrical energy comprising a meter having a rotatable shaft and two register dials, a lighting circuit, a power circuit, means for operatively connecting said shaft to either of said dials, means for normally maintaining said shaft operatively connected to one of said dials, and means for maintaining said shaft operatively connected to the other of said dials when the electrical condition of said lighting circuit undergoes a predetermined change.

12. A system of metering electrical energy comprising a meter having a rotatable shaft and two register dials, two sets of electric translating devices, means for normally maintaining said shaft in operative relation with one of said dials, and means responsive to a predetermined change in the electrical condition of one of said sets of translating devices for placing said shaft in operative relation with the other dial.

13. A system of metering electrical energy comprising a meter having a rotatable shaft and a plurality of register dials, a plurality of sets of electric translating devices, a movable member for placing said shaft in operative relation with one of said dials, an electromagnet having a winding included in the circuit of one of said sets of translating devices, a movable armature coöperating with said electromagnet, means for operatively connecting said armature to said movable member, and means for normally holding said armature in one position.

14. A system of metering electrical energy comprising a meter having a rotatable shaft and two register dials, a lighting circuit, a power circuit, a movable member for placing either of said dials in operative relation with said shaft, an electromagnet having a winding included in the lighting circuit, a movable armature coöperating with said electromagnet, means for operatively connecting said armature to said movable member, and means for normally holding said armature in one position.

In witness whereof, I have hereunto set my hand this 6th day of July, 1912.

KARL MARKAU.

Witnesses:
FRITZ WALLMÜLLER,
KURT F. RADMANN.

---

Copies of this patent may be obtained for five cents each, by addressing the "Commissioner of Patents, Washington, D. C."

---

Correction in Letters Patent No. 1,077,729.

It is hereby certified that in Letters Patent No. 1,077,729, granted November 4, 1913, upon the application of Karl Markau, of Berlin, Germany, for an improvement in "Systems of Electric Metering," an error appears in the printed specification requiring correction as follows: Page 2, line 59, for the words "be taken by both sets of" read *can be taken only by the;* and that the said Letters Patent should be read with this correction therein that the same may conform to the record of the case in the Patent Office.

Signed and sealed this 9th day of December, A. D., 1913.

[SEAL.]

J. T. NEWTON,

*Acting Commissioner of Patents.*

13. A system of metering electrical energy comprising a meter having a rotatable shaft and a plurality of register dials, a plurality of sets of electric translating devices, a movable member for placing said shaft in operative relation with one of said dials, an electromagnet having a winding included in the circuit of one of said sets of translating devices, a movable armature coöperating with said electromagnet, means for operatively connecting said armature to said movable member, and means for normally holding said armature in one position.

14. A system of metering electrical energy comprising a meter having a rotatable shaft and two register dials, a lighting circuit, a power circuit, a movable member for placing either of said dials in operative relation with said shaft, an electromagnet having a winding included in the lighting circuit, a movable armature coöperating with said electromagnet, means for operatively connecting said armature to said movable member, and means for normally holding said armature in one position.

In witness whereof, I have hereunto set my hand this 6th day of July, 1912.

KARL MARKAU.

Witnesses:
FRITZ WALLMÜLLER,
KURT F. RADMANN.

---

Copies of this patent may be obtained for five cents each, by addressing the "Commissioner of Patents, Washington, D. C."

---

It is hereby certified that in Letters Patent No. 1,077,729, granted November 4, 1913, upon the application of Karl Markau, of Berlin, Germany, for an improvement in "Systems of Electric Metering," an error appears in the printed specification requiring correction as follows: Page 2, line 59, for the words "be taken by both sets of" read *can be taken only by the;* and that the said Letters Patent should be read with this correction therein that the same may conform to the record of the case in the Patent Office.

Signed and sealed this 9th day of December, A. D., 1913.

[SEAL.]

J. T. NEWTON,

*Acting Commissioner of Patents.*

It is hereby certified that in Letters Patent No. 1,077,729, granted November 4, 1913, upon the application of Karl Markau, of Berlin, Germany, for an improvement in "Systems of Electric Metering," an error appears in the printed specification requiring correction as follows: Page 2, line 59, for the words "be taken by both sets of" read *can be taken only by the;* and that the said Letters Patent should be read with this correction therein that the same may conform to the record of the case in the Patent Office.

Signed and sealed this 9th day of December, A. D., 1913.

[SEAL.]

J. T. NEWTON,

*Acting Commissioner of Patents.*